D. B. SMITH.
COMBINED SPIDER AND BAKING PAN.

No. 183,818. Patented Oct. 31, 1876.

WITNESSES:
W. W. Hollingsworth
Solon C. Kemon

INVENTOR:
David Burel Smith
BY
ATTORNEYS.

UNITED STATES PATENT OFFICE.

DAVID B. SMITH, OF BASTROP, LOUISIANA.

IMPROVEMENT IN COMBINED SPIDER AND BAKING PAN.

Specification forming part of Letters Patent No. 183,818, dated October 31, 1876; application filed October 15, 1875.

*To all whom it may concern:*

Be it known that I, DAVID BUREL SMITH, of Bastrop, in the parish of Morehouse and State of Louisiana, have invented a new and Improved Combined Spider and Baking Pan; and I do hereby declare that the following is a full, clear, and exact description of the same, reference being had to the accompanying drawing, forming a part of this specification, in which—

Figure 1:
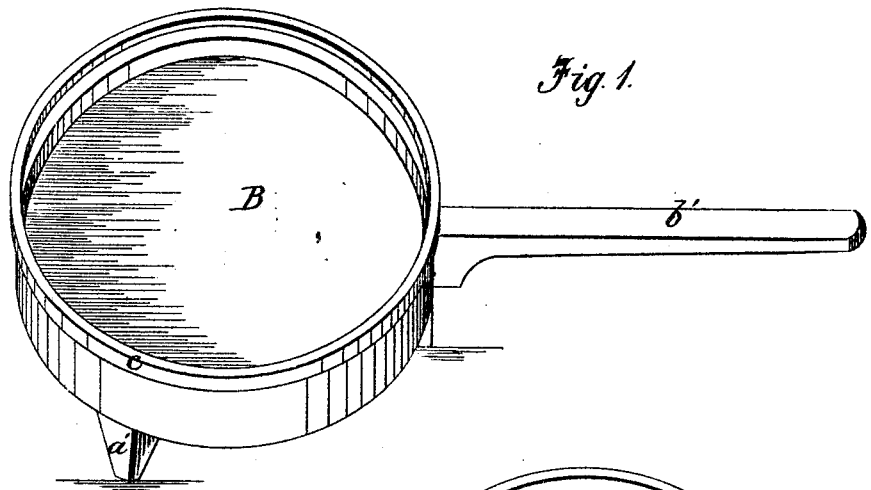
Figure 2:
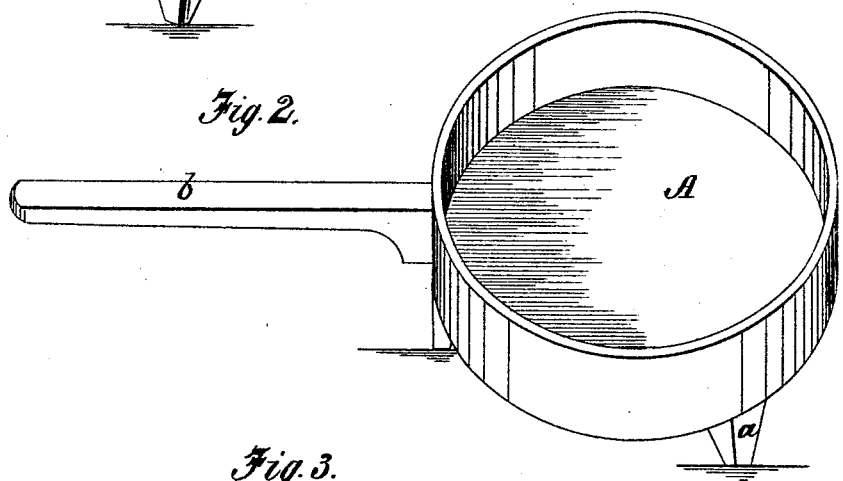
Figure 3:
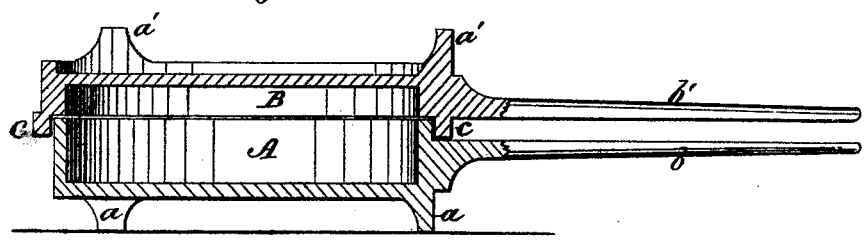

Figures 1 and 2 are perspective views of the spider and baking-pan, when used separately. Fig. 3 is a vertical section of the same when used together to form a closed cooking-vessel.

The object of this invention is to provide a combined spider and baking-pan, which are designed for use either separately for the different uses for which they are adapted, or for use in combination, in which case the baking-pan forms the cover to the spider. It consists of a spider or oven-shaped vessel, provided with legs and handles in combination with a similar vessel of much less depth, which forms the baking-pan applicable for cakes, biscuits, &c., which said baking-pan is provided with a flanged edge, so as to fit upon the other vessel and form a tight cover therewith, so as to form a closed chamber for the various cooking purposes, to which it may be applicable.

In the drawing, A represents the spider or the deeper one of the two vessels, which is provided with legs $a$ and a handle, $b$. B is the baking-pan, which is made shallow, and provided with legs $a'$ and a handle, $b'$, to adapt it to independent use when required for baking biscuits, cakes, &c. Said baking-pan is provided with a flange, $c$, which, when the pan is used as a cover to the spider, overlaps the outer edge and makes a tight joint, which retains the flavors of the viands to be cooked, and prevents the ashes and coals, which are placed upon the top of the pan from getting inside. Thus it will be seen that the spider may be used for frying, and its top for a baking-pan when used separately, and when combined they constitute a single closed vessel, which invention is specially applicable in any of its uses to fire-place cooking, and supplies a need long felt, but hitherto unsupplied. Moreover, inasmuch as the baking-pan will cost but little more than the ordinary spider-lid, it will be seen that the full benefit of two articles is had with but the cost of one, and a better cooking-vessel produced by the combination of the two than either would be separately. In combination with the cooking-vessel, as thus described, a suitable griddle may be used fitting therein.

I am aware of the fact that numerous broiling-pans and gridirons have been constructed, in which two pans of equal depth have been placed together to form a cooking-chamber; and I therefore disclaim Patents Nos. 162,961, 10,118, 61,478, 119,892, 142,164, and such others as do not show two utensils of different depth adapted to be used singly for different purposes or together, to constitute a single closed cooking-chamber, and I accordingly limit my invention to the particular construction of the utensil as claimed.

Having thus described my invention, what I claim as new is—

The combination, with the vessel A, provided with legs $a$ and handle $b$, the latter located below the top of the vessel A for the reception of an outer flange, of the shallow vessel B, provided with legs $a'$, handle $b'$, and a flange, $c$, the latter being of sufficient size to receive the top of vessel A, the several parts constructed and arranged substantially as and for the purpose set forth.

DAVID BUREL SMITH.

Witnesses:
A. L. BUSSEY,
H. D. VAUGHAN.